(12) United States Patent
Nishida (10) Patent No.: US 6,232,933 B1
(45) Date of Patent: May 15, 2001

(54) DUMMY MAGNIFYING DISPLAY APPARATUS

(75) Inventor: Shinsuke Nishida, Tokyo (JP)

(73) Assignee: Fourie, Inc., Tokyo (JP)

( * ) Notice: Subject to any disclaimer, the term of this patent is extended or adjusted under 35 U.S.C. 154(b) by 0 days.

(21) Appl. No.: 09/154,144

(22) Filed: Sep. 17, 1998

(30) Foreign Application Priority Data

Sep. 30, 1997 (JP) .................................................. 9-267166

(51) Int. Cl.[7] .................................................. G09G 5/00
(52) U.S. Cl. .................................. 345/1; 345/2; 348/383
(58) Field of Search .................................. 345/1, 383, 345; 343/717, 707

(56) References Cited

U.S. PATENT DOCUMENTS

| | | | |
|---|---|---|---|
| 3,699,667 | * 10/1972 | Gomez | 35/9 B |
| 4,538,993 | * 9/1985 | Krumholz | 343/307 |
| 4,684,935 | * 8/1987 | Fujisaku et al. | 340/717 |
| 4,759,717 | * 7/1988 | Larochelle et al. | 343/118 |
| 4,785,472 | * 11/1988 | Shapiro | 343/307 |
| 5,117,225 | * 5/1992 | Wang | 340/717 |
| 5,361,078 | * 11/1994 | Caine | 345/1 |
| 5,537,127 | * 7/1996 | Jingu | 345/1 |
| 5,657,046 | * 8/1997 | Noble et al. | 345/123 |

FOREIGN PATENT DOCUMENTS 9144296    6/1997   (JP) .

* cited by examiner

*Primary Examiner*—Richard Hjerpe
*Assistant Examiner*—Kimnhung Nguyen
(74) *Attorney, Agent, or Firm*—Sughrue, Mion, Zinn, Macpeak & Seas, PLLC (57) ABSTRACT

A dummy magnifying display apparatus, in which a magnified screen comprises a plane section and a slant section. The plane section comprises a screen display section located on a flat surface of a wall or the like. The slant section is provided at an angle between the wall and a ceiling and also located so that user U's eyes and a screen form a substantially right angle. An image that the user could see on the dummy screen is displayed on the slant section. When an image of a smokestack is displayed, for example, a lower half section of the smokestack appears on the plane section and an upper half section thereof appears on the slant section. In this case, the smokestack displayed on the slant section appears by being compressed in the longitudinal direction thereof. With those steps, it actually looks from the position of the user as if the upper half section of the smokestack is displayed on the dummy screen. As a result, a screen larger than the actual screen can be obtained.

6 Claims, 14 Drawing Sheets

| DISPLAY RESOLUTION INFORMATION | ADDRESS INFORMATION | DISPLAY DATA INFORMATION |
|---|---|---|

FIG.5

| DISPLAY RESOLUTION INFORMATION | ADDRESS INFORMATION | DISPLAY DATA INFORMATION |
|---|---|---|
| FOUR-DIVIDED | ADDRESS 「01」 | 1≑ON |

SMOKESTACK

| 0000 | 0001 | .... |      |
|------|------|------|------|
| 0010 |      |      | ⋮    |
| ⋮    |      |      | 1101 |
|      | .... | 1110 | 1111 |

FIG.11B

| 0000 | 0001 | .... |      |
| 0010 |      |      | ⋮    |
| ⋮    |      |      | 1101 |
|      | .... | 1110 | 1111 |

DUMMY MAGNIFYING DISPLAY APPARATUS

FIELD OF THE INVENTION

The present invention relates to a dummy magnifying display apparatus and more particularly, to a dummy magnifying display apparatus that can artificially obtain a screen of which size is larger than an actual screen.

BACKGROUND OF THE INVENTION

In recent years, an electronic display has played an extremely important role in the society of information, and has widely been used in various fields regardless of both the industrial fields and consumer fields. The electronic display converts an electric signal outputted from electronic equipment to an optical information signal visually recognized by human. There have been known displays, as an ordinary electronic display, such as a cathode-ray tube display (CRT), a plasma display (PDP), an electroluminescent display (ELD), a liquid crystal display (LCD) referred to as a receptor type, and an electrochemical display (ECD).

Also, in recent years, the needs of the society to a low profile and light display capable of being driven with low voltage as well as with low power consumption has zoomed while a large number of compact, light and power-saved displays have been developed in association with rapid progress in IC and LSI. Further, it has been strongly desired to develop a display capable of supporting abrupt increase of an amount of information to be processed. Especially, with progress in multimedia technology, the electronic display has increased in importance as an indispensable item for accessing cyber space, and a larger size of screen with higher resolution has been desired further more strongly.

However, an image transfer system in the conventional type of electronic display is based on a scanning line system for continuously transferring image data at preset resolution as well as with a preset number of scanning lines, and this conventional type of display can not basically support a case where a size of a screen is arbitrarily changed for changing the resolution (the number of display elements in the lateral direction) as well as the number of scanning lines (the number of display elements in the longitudinal direction), and for this reason, the idea itself that the size of a screen can arbitrarily be changed by a user is impossible to come up in maker's mind.

For example, even when the size of a screen is made larger and resolution (the number of display elements in the lateral direction) and the number of scanning lines (the number of display elements in the longitudinal direction) are increased, the resolution and the number of scanning lines of image data to be sent with the scanning line system remain the same, so that image display using the entire screen is impossible. Also, when an image is to be displayed, the image is resultantly displayed on a part of the screen corresponding to the resolution as well as to the number of scanning lines of the transferred image data. In other words, even when the size of a screen is made larger, resolution of an image to be displayed on the screen can not be made higher.

SUMMARY OF THE INVENTION

The present applicant has already applied for another invention as an invention for solving the problems described above (Japanese Patent Laid-Open Publication No. HEI 9-144296). The application can be referred to for further detail.

It is an object of the present invention to provide an effective screen display system based on the concepts underlying the invention having been applied for.

A dummy magnifying display apparatus according to the present invention forms with a first display unit with display elements arranged at a matrix to form a screen as well as with a second display unit having the same configuration as that of the first display unit and connected to the first display unit at an angle to form a screen. Then, the screen is repeatedly divided in the first display unit. A dummy display section obtained by extending the first display unit is provided on the second display unit, an image to be displayed on the dummy display section is displayed on the second display unit, and the screen is repeatedly divided taking into consideration a positional relation between the first display unit and the second display unit. Then, an image is displayed on a part or whole screen of the first and second display units by setting an address to each of the divided unit areas each time when the screen is divided, specifying this address, and giving display data to be displayed with a display element belonging to the specified divided unit area thereto. A control unit controls the operations described above.

A dummy magnifying display apparatus according to the present invention has a main display unit located at the front part inside a hall and also has seat display units provided on the rear surfaces of seats each facing the front part therein. Also, each of the seat display units displays thereon a part of an image to be displayed on the main display unit and matches the main display unit by repeatedly dividing a screen taking into consideration a positional relation between the main display unit and each of the seat display units. For this reason, a plurality of users can see an image in a large screen. Especially, the front seats and users seated therein are not seen from users seated in the rear side, which allows any user to fully enjoy images.

Other objects and features of this invention will become understood from the following description with reference to the accompanying drawings.

DESCRIPTION OF THE PREFERRED EMBODIMENTS

Detailed description is made for preferred embodiments of the present invention with reference to the related drawings. It should be noted that the present invention is not limited by those embodiments.

Figure 1:
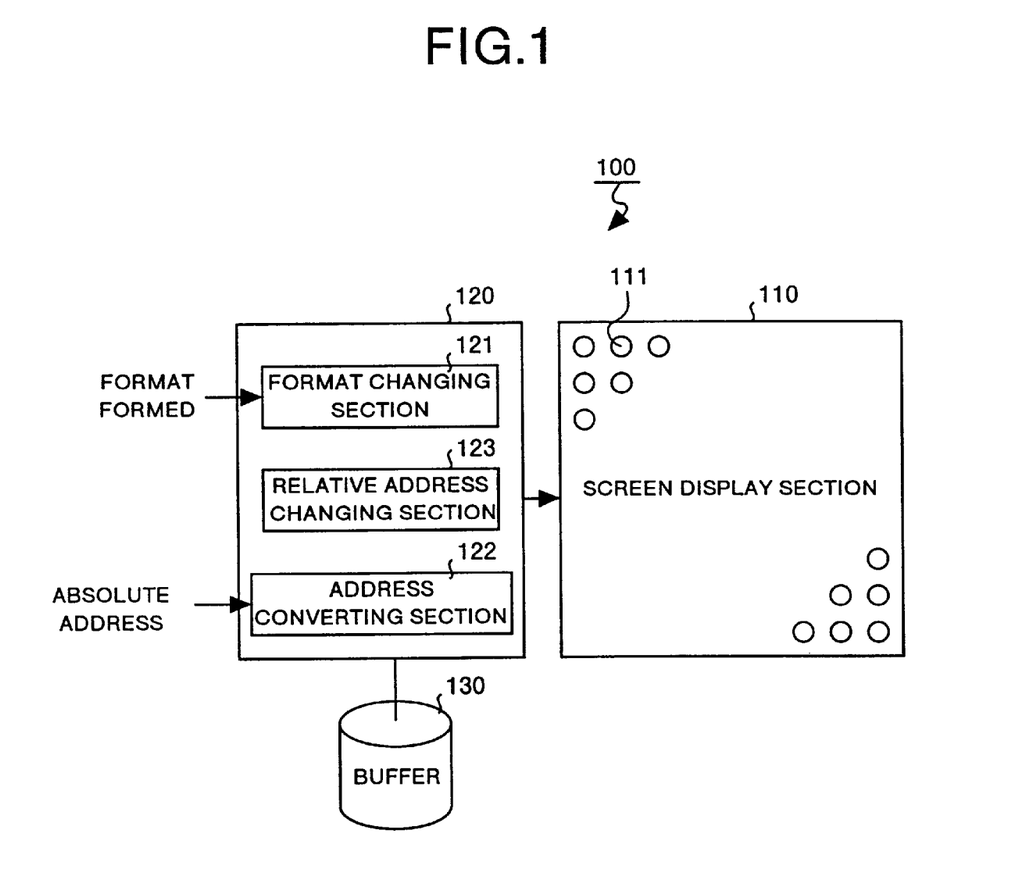
FIG. 1 is a block diagram schematically showing a display apparatus according to the invention having already been applied for by the present applicant.
Figure 2:
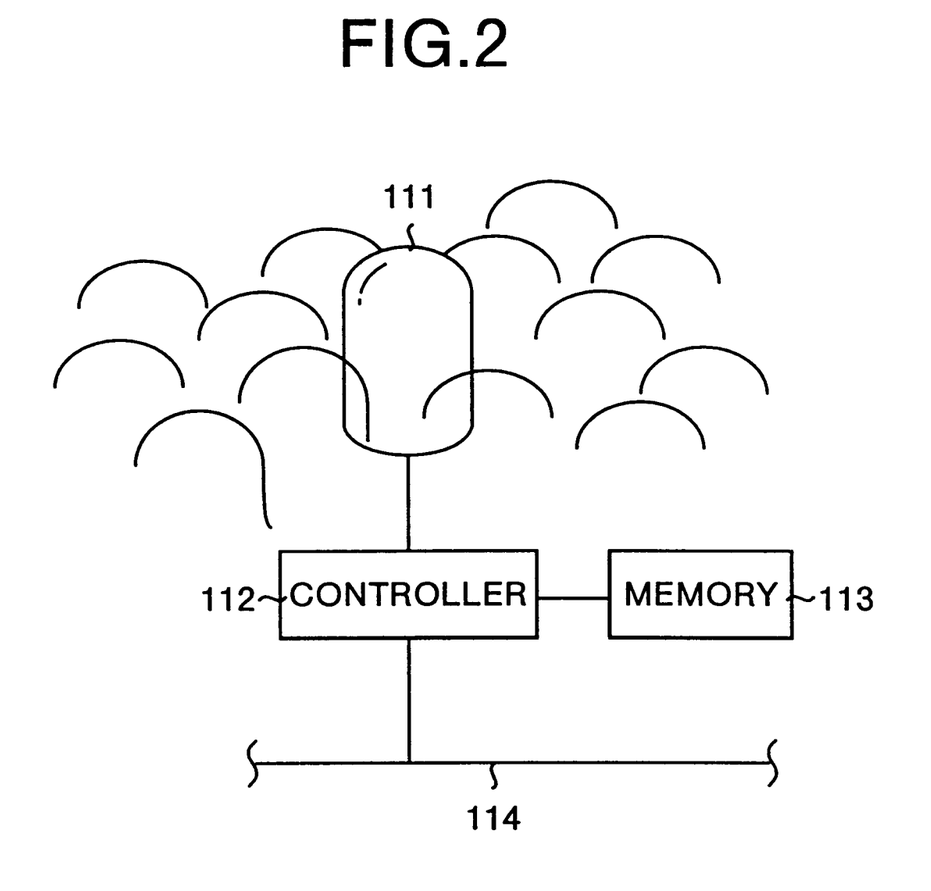
FIG. 2 is a schematic view showing a construction of display elements shown in FIG. 1.

The present invention artificially enlarges an actual screen, and at first, description is made for contents of a display apparatus used for this dummy magnifying display apparatus. FIG. 1 is a schematic block diagram of the display apparatus 100. This display apparatus 100 comprises a screen display section 110 formed with display elements 111 arranged at a matrix, and a control section 120 for controlling this screen display section 110. The control section 120 has a format changing section 121, an address converting section 122, and a relative address changing section 123. FIG. 2 is a block diagram schematically showing a construction of the display elements 111. Each of the display elements 111 has a controller 112 for controlling a display state of the display element 111 and a memory (storing section) 113 for storing therein address information for the display element 111 respectively. The reference numeral 114 indicates a signal transferring section for executing signal transaction between the controller 112 and the control section 120. The reference numeral 130 indicates a buffer for temporarily storing therein a display signal. Located inside the display element 111 are three light-emitting diodes R, G, and B, so that color display can be performed with the three colors of R (Red), G (Green), and B (Blue). It should be noted that power is supplied from a home power supply unit.

Allocated to each of the display elements 111 is a specific address (absolute address) respectively at the time of production thereof, and the absolute address is stored in the memory 113. The controller 112 selects and acquires a signal corresponding to the absolute address of the display element 111 from display signals sent from the signal transferring section 114. Each of the absolute addresses is set specifically to each of the display elements, and for this reason, even when addresses are allocated to display elements and transferred, the display elements actuate randomly, which does not allow an image as a whole to be displayed. For this reason, it is required to convert an absolute address of a display element 111 to a relative address for enabling formation of an image according to a specified format. The address converting section 122 converts an absolute address to a relative address.

A format is, as shown in FIGS. 3A to 3D, based on a system by dividing a screen on the display section 110 into quarters and repeating the division thereof one after another. Although the screen can physically be divided into a unit of display element 111, the screen can further be divided artificially by controlling a display state of the display element 111 (such as suppression of a light-emitting rate to 70%). It should be noted that a case of repeating the division of the screen into quarters has been assumed in FIGS. 3A to 3D, but the format is not limited to this format. For example, a format at which a screen is divided only in the longitudinal direction may be employed.

Figure 3A:
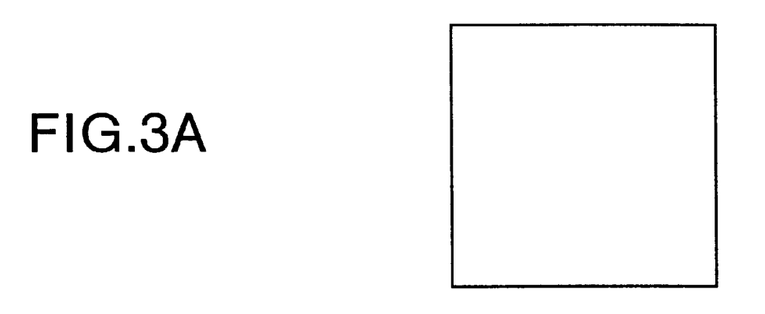
FIGS. 3A to 3D are explanatory views showing examples of a format.
Figure 3B:
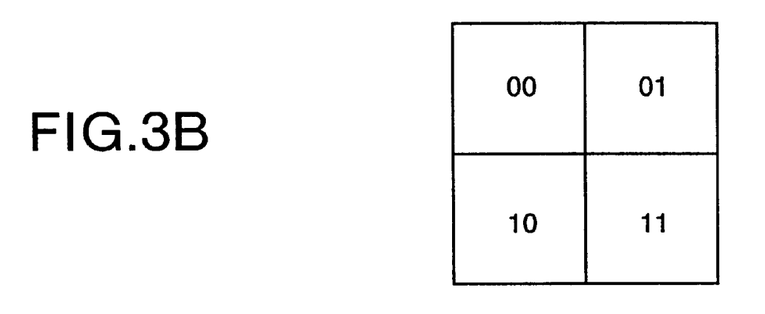
Figure 3C:
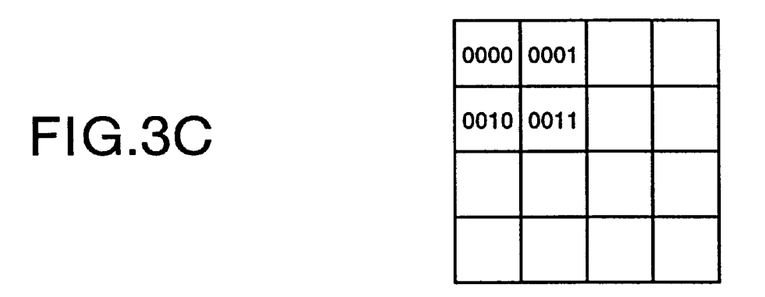
Figure 3D:
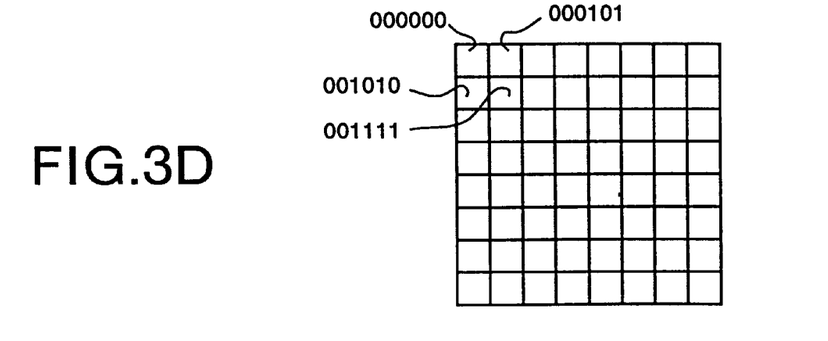

An absolute address allocated to each of the display elements 111 is converted to a relative address according to the format. An address conversion table for storing therein a correlation between absolute addresses and relative addresses is provided for the conversion. Next description is made for a relative address to which an absolute address is converted. As shown in FIGS. 3B to 3D, relative addresses each consisting of 2 bits: "00", "01", "10", and "11" are set to divided unit areas respectively for each division of the screen into quarters. When one of the divided unit areas is further divided into quarters, each relative address of 2 bits indicated by "00", "01", "10", and "11" is added to each of the low order of the relative address respectively. For example, divided unit areas obtained by dividing one of divided unit areas having a relative address "00" into quarters are indicated with formats obtained by adding 2 bits of "00" to "11" to each low order of the relative address "00", namely, the formats are "0000", "0001", "0010", and "0011". A relative address is set each time when a screen is divided as described above. It should be noted that setting a relative address does not also necessarily use a format expressed with 2 bits as described above on condition that a divided unit area can be specified.

Figure 4:
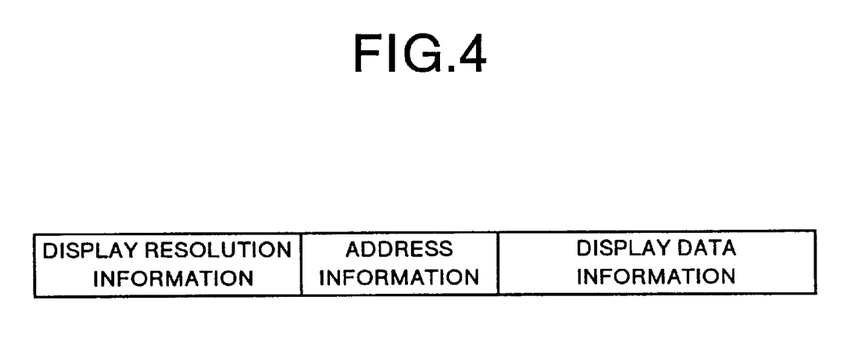
FIG. 4 is an explanatory view showing a structure of a display signal to be supplied to the screen display section shown in FIG. 1.
Figure 5:
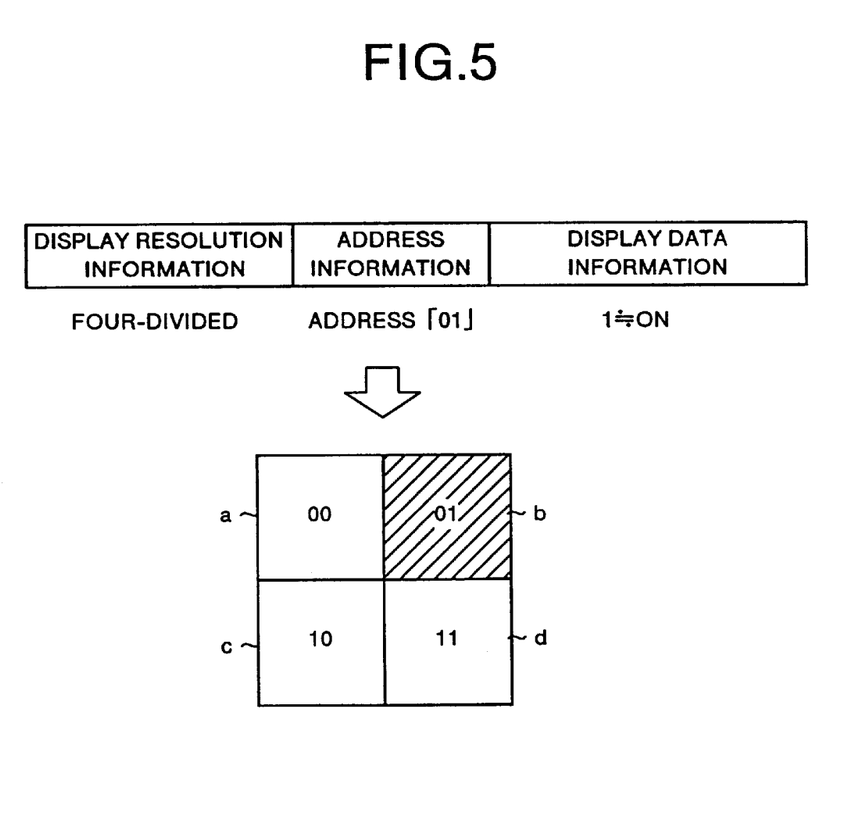
FIG. 5 is an explanatory view showing an example of display according to the display signal.

FIG. 4 is an explanatory view showing a structure of a display signal to be supplied to the screen display section 110. A display signal comprises information for display resolution, information for relative address, and information for display data. The information for display resolution is information indicating the number of divisions of a screen. The information for relative addresses is information for specifying a divided unit area and is expressed with 2 bits as described above. The information for display data is information indicating display contents in the divided unit area specified by the information for relative address. For example, as shown in FIG. 5, the display resolution information "0001" indicates a four-divided screen (areas a to d). Also, the relative address information "01" indicates that a divided unit area b is specified. The display data information "1" indicates that the specified area b is turned "ON".

Figure 6:
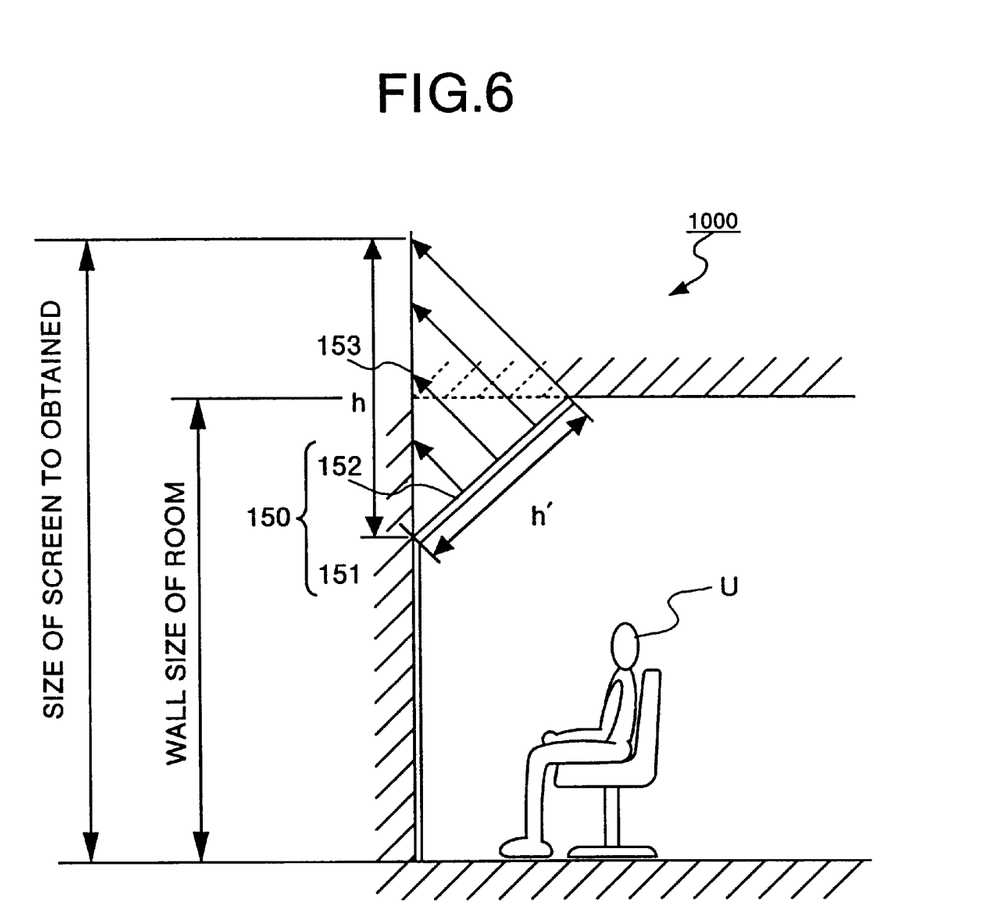
FIG. 6 is an explanatory view schematically showing a dummy magnifying display system according to Embodiment 1 of the present invention.

FIG. 6 is an explanatory view schematically showing a dummy magnifying display apparatus 1000 according to Embodiment 1 of the present invention. This dummy magnifying display apparatus 1000 is constructed with the display apparatus 100 described above. A magnified screen 150 comprises a plane section 151 and a slant section 152. The plane section 151 is constructed by providing the screen display section 110 on a flat surface of a wall or the like. The slant section 152 is provided at an angle between the wall and a ceiling. The slant section 152 is also located so that user U's eyes and the screen form a substantially right angle. In the same figure, the reference numeral 153 indicates a dummy screen. An image that the user could see on the dummy screen 153 is displayed on the slant section 152 of the magnified screen 150.

Figure 7:
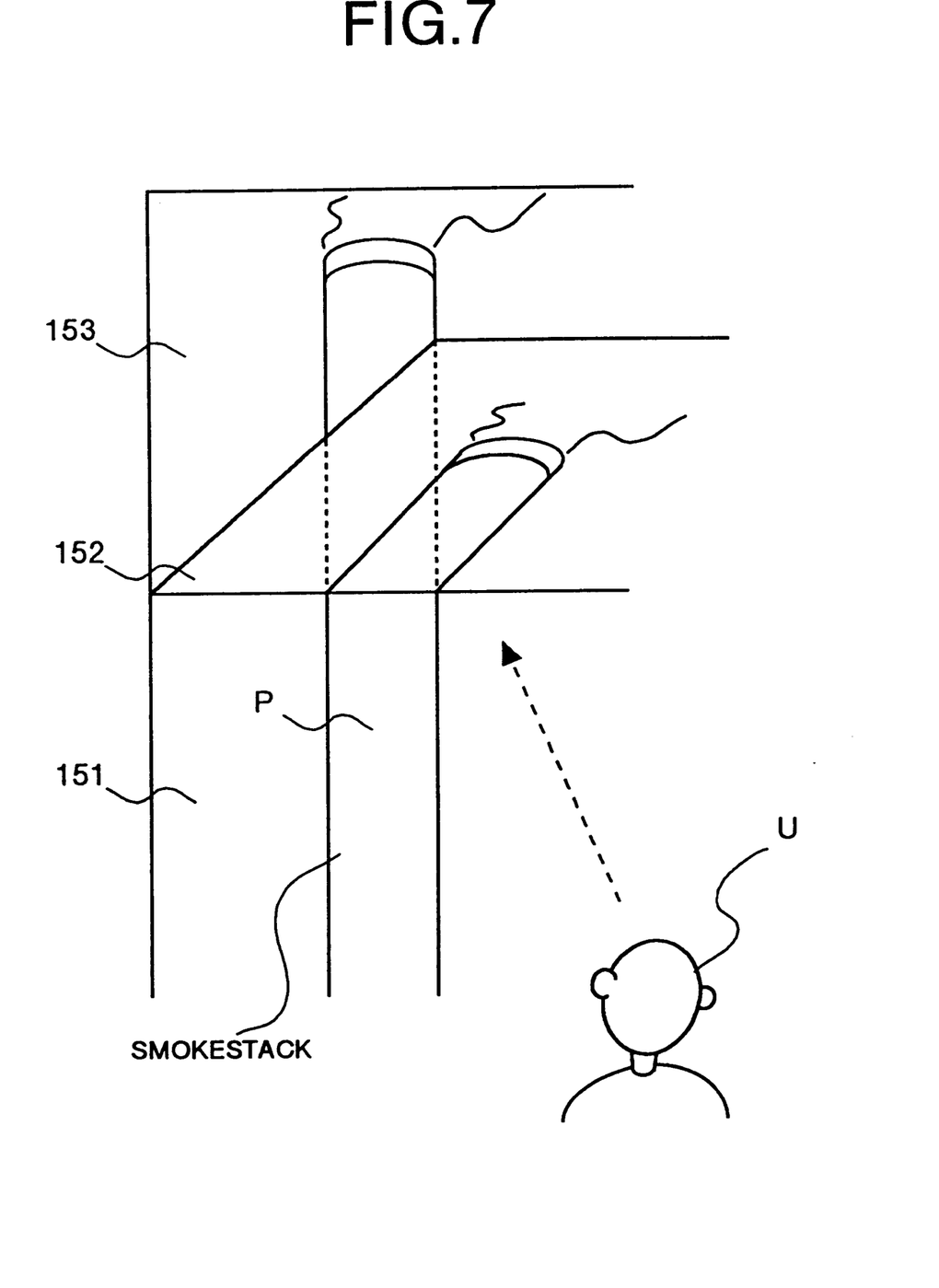
FIG. 7 is an explanatory view showing a relation between a dummy screen and a slant section.

When an image of a smokestack P is displayed as shown in FIG. 7, for example, a lower half section of the smokestack appears on the plane section 151 and an upper half section thereof appears on the slant section 152. In this case, the smokestack displayed on the slant section 152 appears by being compressed in the longitudinal direction thereof.

For this reason, it actually looks from the position of the user U as if the upper half section of the smokestack is displayed on the dummy screen 153. Displayed as described above can obtain a screen larger than the wall of a room.

Figure 8A:
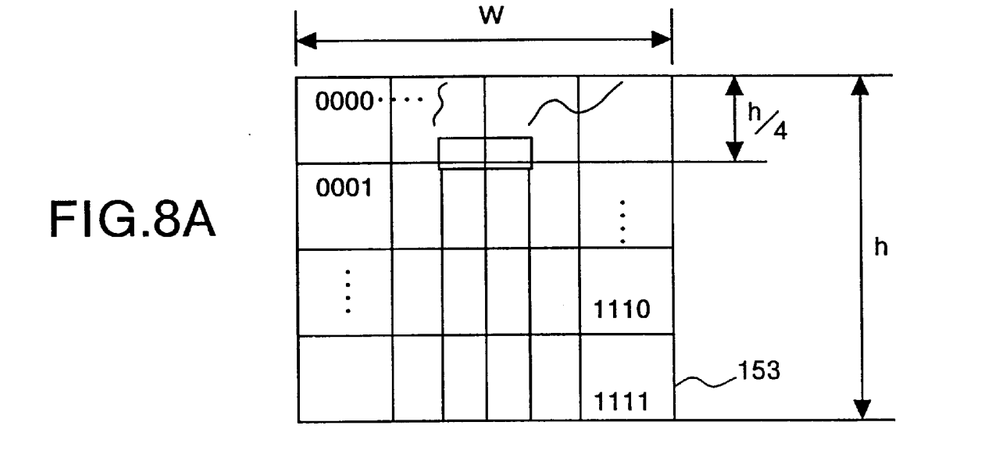
FIGS. 8A and 8B are explanatory views showing a relation between a dummy screen and a slant section.
Figure 8B:
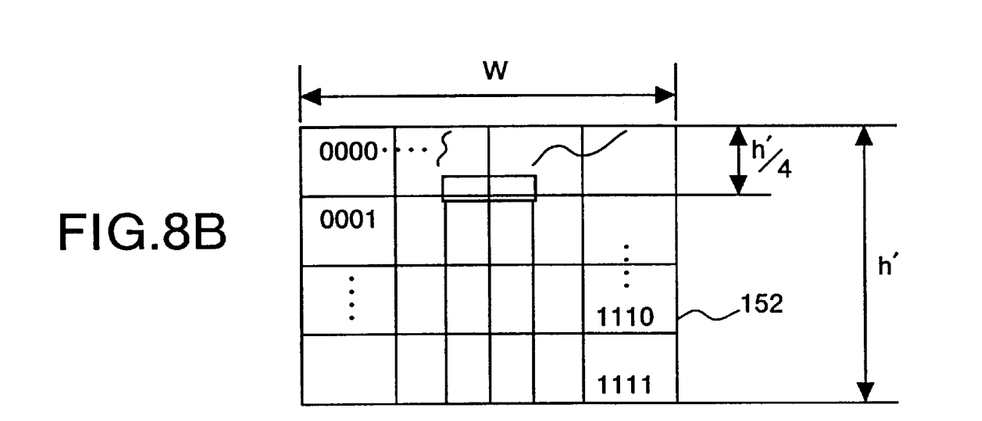

FIGS. 8A and 8B are explanatory views showing a relation between the dummy screen 153 and the slant section 152. In order to show the image (smokestack) displayed on the dummy screen 153 to a user, the image compressed (format-changed) in the longitudinal direction thereof (connected direction) appears on the slant section 152. Changing a format is executed by the format changing section 121. A compression rate is h'/h from a ratio between the dummy screen 153 and the slant section 152 in the longitudinal direction. Compression of the image in the lateral direction is not required, so that a width W of the screen is not changed. The slant section 153 is repeatedly divided into quarters as described above. Setting relative addresses to divided unit areas is also performed similarly to that in FIGS. 3A to 3D. Actually, formats for four division are executed to the magnified screen 150 obtained by combining the plane section 151 with the slant section 152, and the compressed image appears on the slant section 152 in this step.

As described above, an image is displayed on the slant section 152, which shows as if a dummy screen 153 exists along the extension of the plane section 151, so that a screen display section of which size is larger than its actual screen can be obtained. Accordingly, a large screen can be obtained even when a wall area is small. In addition, wiring can be provided in the rear side of the slant section 152, which is convenient for installation of the apparatus. Further, even when there are beams or the like in a room, the screen display section 110 can be located so as to cover those beams.

Figure 9:
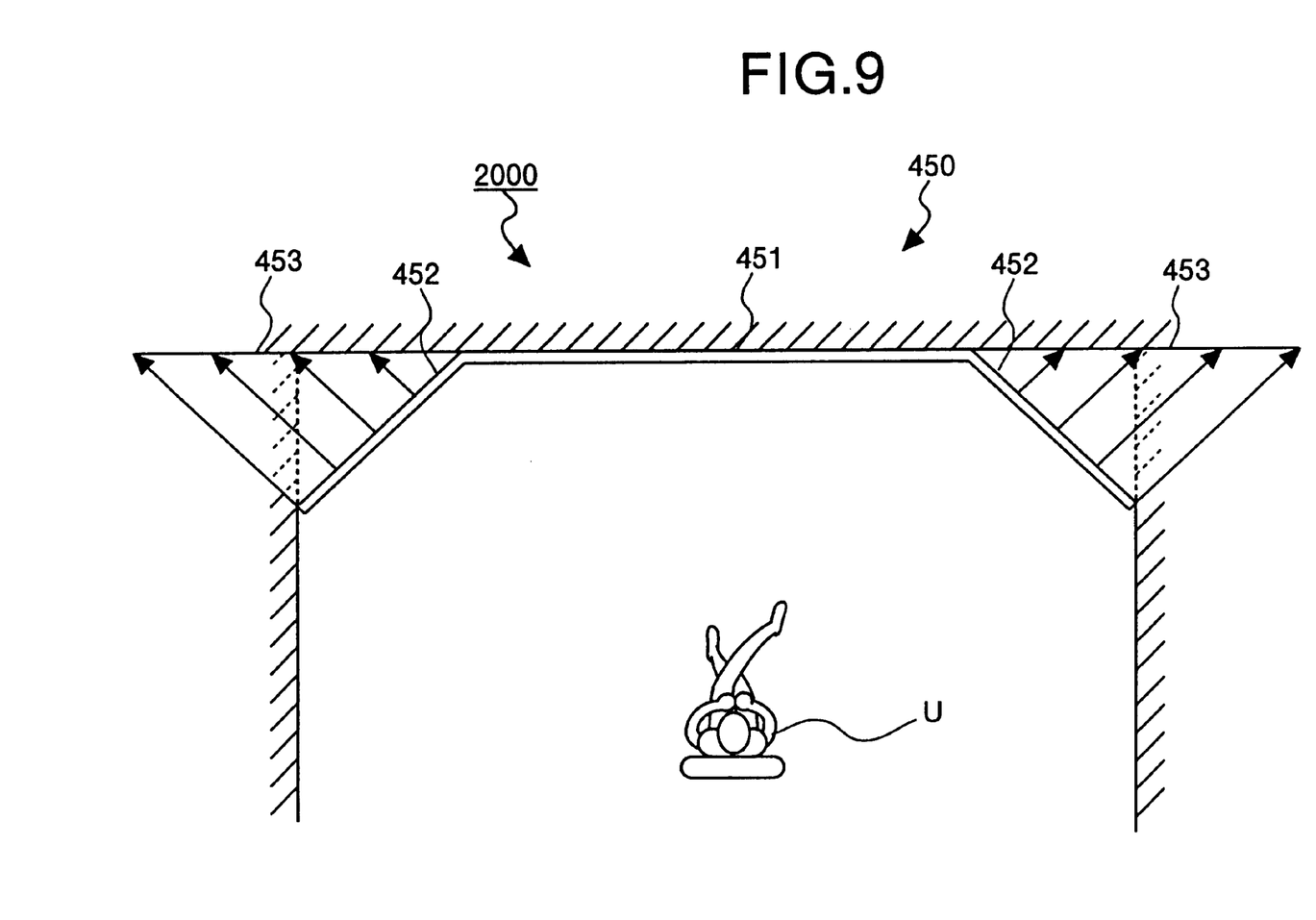
FIG. 9 is an explanatory view schematically showing a dummy magnifying display system according to Embodiment 2 of the present invention.

FIG. 9 is an explanatory view schematically showing a dummy magnifying display apparatus 2000 according to Embodiment 2 of the present invention. This dummy magnifying display apparatus 2000 is constructed with the display apparatus 100, and has dummy screens 453 provided in both sides thereof as shown in the figure. A magnified screen 450 comprises a plane section 451 and slant sections 452, 452. The plane section 451 is constructed by providing the screen display section 110 on a flat surface of a wall or the like. The screen display section 110 of the slant section 452 is provided at an angle between a front wall and a side face wall. The slant section 452 is also located so that user U's eyes and the screen form a substantially right angle. An image that the user could see on the dummy screen 453 is displayed on the slant sections 452 of the magnified screen 450.

In this case, the image compressed in its lateral direction also appears on the slant sections 252, and actually, it looks from the position of the user U as if the image is displayed further longer in the lateral direction than the dummy screen 453. Displayed as described above can obtain a screen larger than the wall of a room. A combination of the dummy magnifying display apparatus 2000 of which screen is magnified in the lateral direction with the dummy magnifying display apparatus 1000 of which screen is magnified in the longitudinal direction may also be employed.

Figure 10:
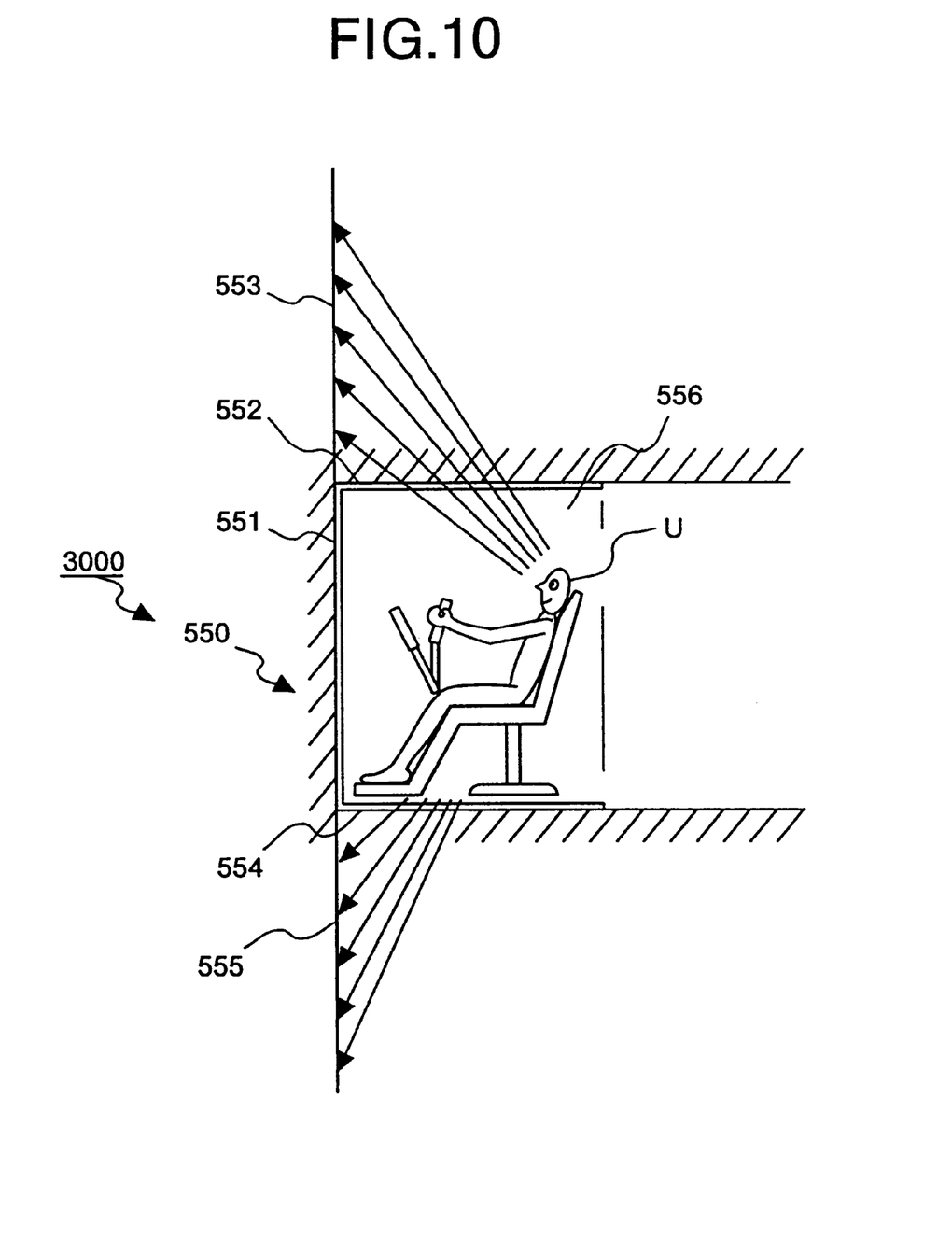
FIG. 10 is an explanatory view schematically showing a dummy magnifying display system according to Embodiment 3 of the present invention.

FIG. 10 is an explanatory view schematically showing a dummy magnifying display apparatus 3000 according to Embodiment 3 of the present invention, and a screen of which is magnified in longitudinal as well as lateral directions. This dummy magnifying display apparatus 3000 is effective for a system with which computer games or simulation or the like can be experienced. A magnified screen 550 comprises a plane section 551 provided in front of a user, an upper surface section 552 provided on the ceiling, a lower surface section 554 installed along the floor surface, and side face sections 556 (side face view is not shown in the figure) provided on both sides of the plane section 551. Displayed on the upper surface section 552 is an image that a user could see on an upper-side dummy screen 553. Similarly, an image that the user could see on a lower-side dummy screen 555 is displayed on the lower surface section 554. Further, displayed also on the side face sections 556 are images that the user could see on dummy screens provided on both sides (not shown) of the plane section.

Figure 11A:
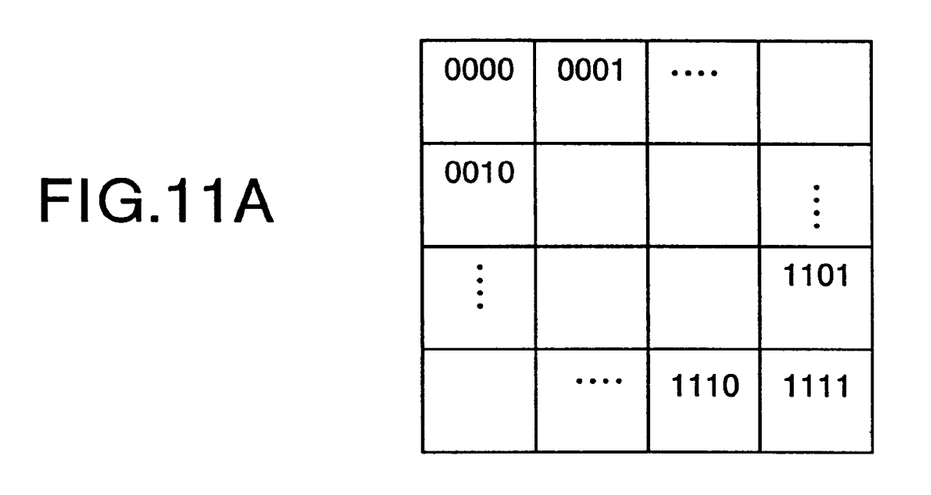
FIGS. 11A and 11B are explanatory views each showing a relation between an upper-side dummy screen and an upper surface section.
Figure 11B:
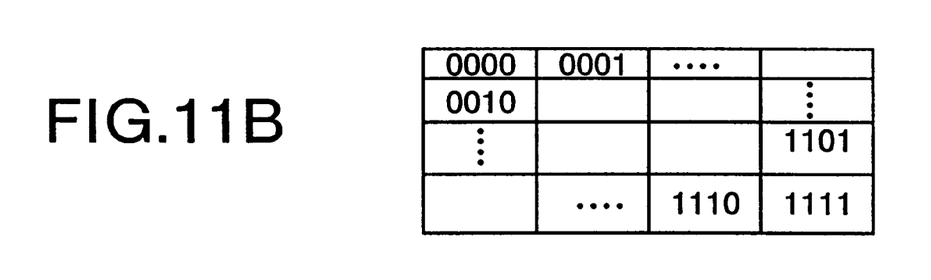

As shown in FIGS. 11A and 11B, setting relative addresses when the upper-side dummy screen 553 (lower-side dummy section 555) is divided into 16 unit areas is the same as that of relative addresses when the upper surface section 552 (lower surface section 554) is divided into 16 unit areas. However, user U's point of view is substantially fixed with a seat S, and the upper surface section 552 and the lower surface section 554 are located each at a right angle to the plane section 551, so that it is preferable to change each form of divided unit areas respectively. Specifically, in order to get a perspective, divided forms of the upper surface section 552 are gradually narrower along upper areas of the dummy screen 553 in the connected direction (FIG. 11B). Each width of the divided unit areas is computed from a positional relation between the upper surface section 552 and the upper-side dummy screen 553. That is the same in a case between the lower surface section 554 and each of the side face sections 556.

Figure 12:
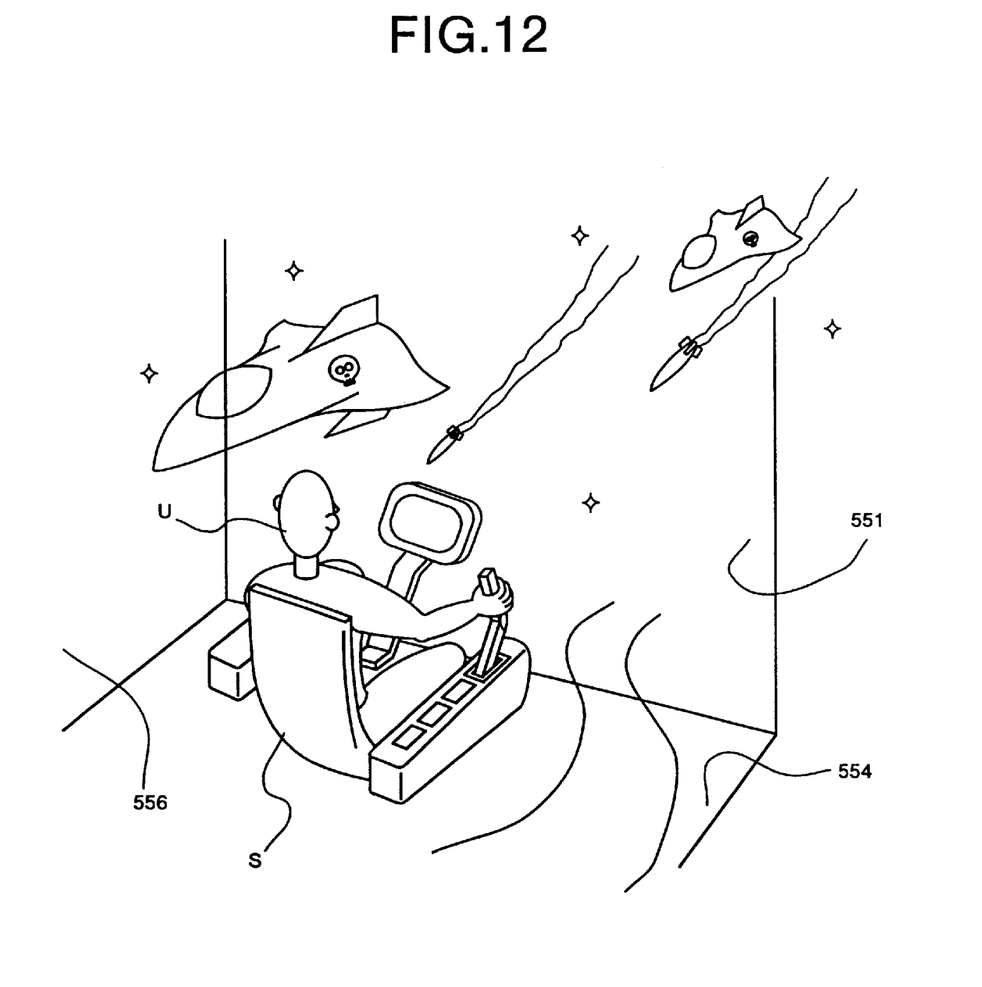
FIG. 12 is an explanatory view showing an example of image display based on the dummy magnifying display system shown in FIG. 10.

FIG. 12 is an explanatory view showing an example of image display based on this dummy magnifying display apparatus 3000. As described above, this dummy magnifying display apparatus 3000 has a magnified screen 550 longitudinally as well as laterally extended, so that a realistic image can be obtained. It is preferable to provide the magnified screen 550 as far as a range where the user U turns his neck when sitting on the seat S and the screen comes within sight of the user.

Figure 13:
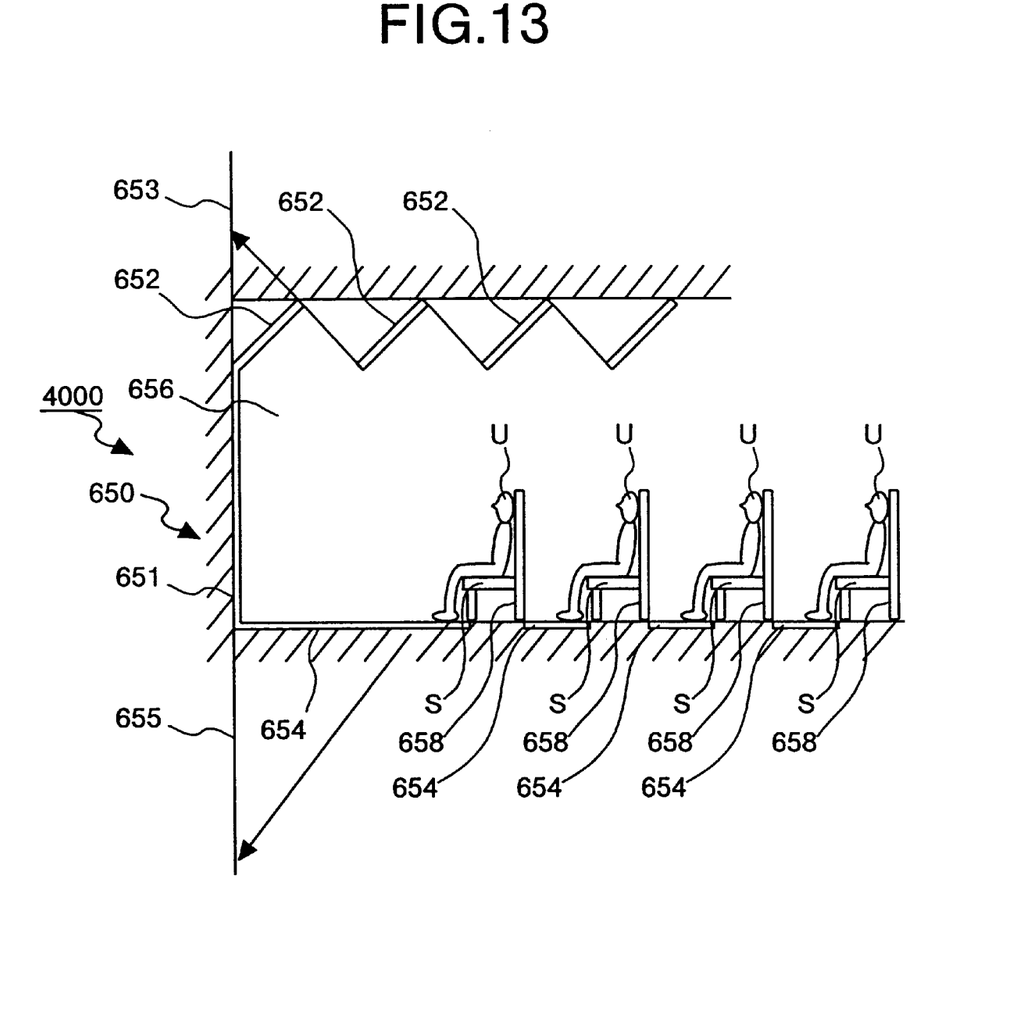
FIG. 13 is an explanatory view schematically showing a dummy magnifying display system according to Embodiment 4 of the present invention.

FIG. 13 is an explanatory view schematically showing a dummy magnifying display apparatus 4000 according to Embodiment 4 of the present invention, which can support a plurality of users. This dummy magnifying display apparatus 4000 is appropriate for a screen used in a movie theater as well as for attractions in a recreation park or similar places. A magnified screen 650 comprises a plane section 651 provided in front of the users, a plurality of slant sections 652 each provided on the ceiling like a blind, a plurality of lower surface sections 654 installed along the floor surface (excluding places under seats S), side face sections 656 (side face view is not shown in the figure) provided on both sides of the plane section 651, and a plurality of rear surface sections 658 each provided on the rear surface of the seat.

Each of the slant section 652 is provided so that user U's eyes and the screen form substantially right angle. Displayed on the slant section 652 is an image that the user could see on an upper-side dummy screen 653. Similarly, an image that the user could see on a lower-side dummy screen 655 is displayed on the lower surface section 654. Further, displayed also on the side face sections 656 are images that the user could see on dummy screens provided on both sides (not shown) of the plane section. Displayed on each of the rear surface sections 658 are a part of an image appearing on the front section 651 that can not be seen because of the front seat as an obstacle and an image that the user could see on the lower-side dummy screen (not shown).

Figure 14:
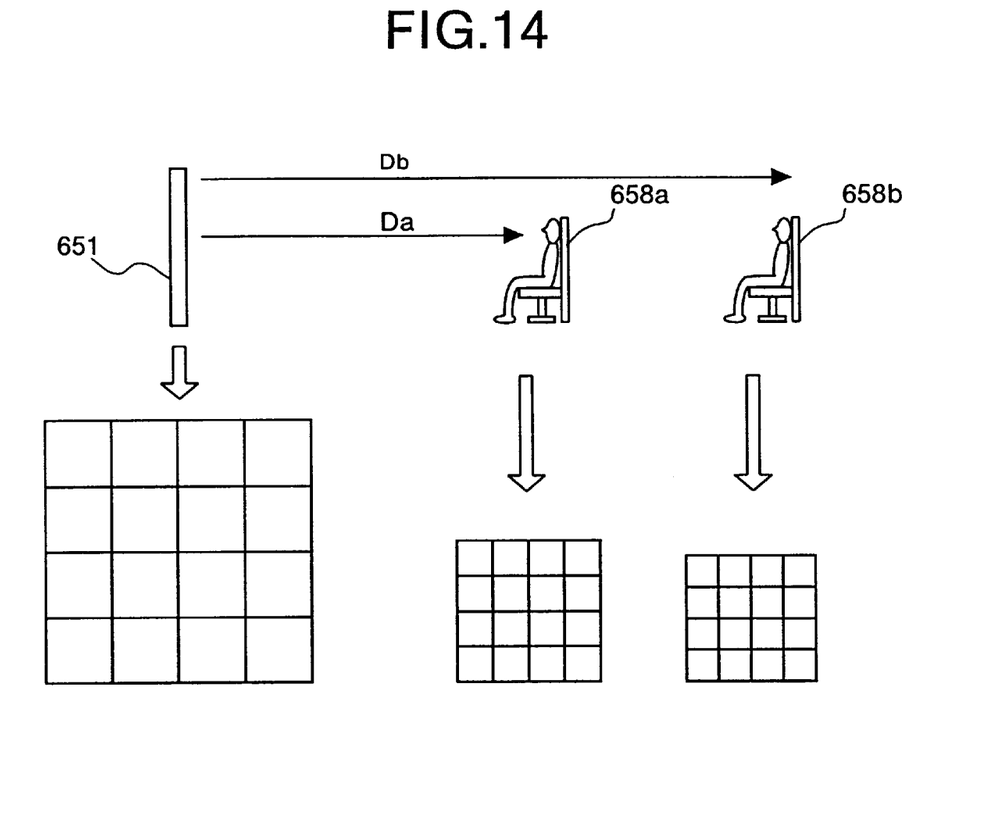
FIG. 14 is an explanatory view showing a relation between a rear surface section and a plane section.

As for setting relative addresses, the same manner as that shown in FIGS. 8A and 8B is performed to the slant sections 652 and the side face sections 656. The same manner as that shown in Figs. 11A and 11B is performed to the lower surface sections 654. Each of the rear surface sections 658 is divided, as shown in FIG. 14, in its state reduced proportionally to the distance from the plane section 651. For example, divided unit areas of a rear surface section 658a are displayed by being reduced proportionally to a distance Da from the plane section 651. Divided unit areas of a rear surface section 658b are displayed by being reduced proportionally to the distance Db from the plane section 651. It should be noted that a user's focal distance to the plane section 651 is different from that to the rear surface section 658, so that accurate matching therebetween is not required so much.

With this dummy magnifying display apparatus 4000, a plurality of users can see images on a large screen. Especially, the front seats S and users U seated therein are not seen from users seated in the rear side, which allows any user to fully enjoy images.

Figure 15:
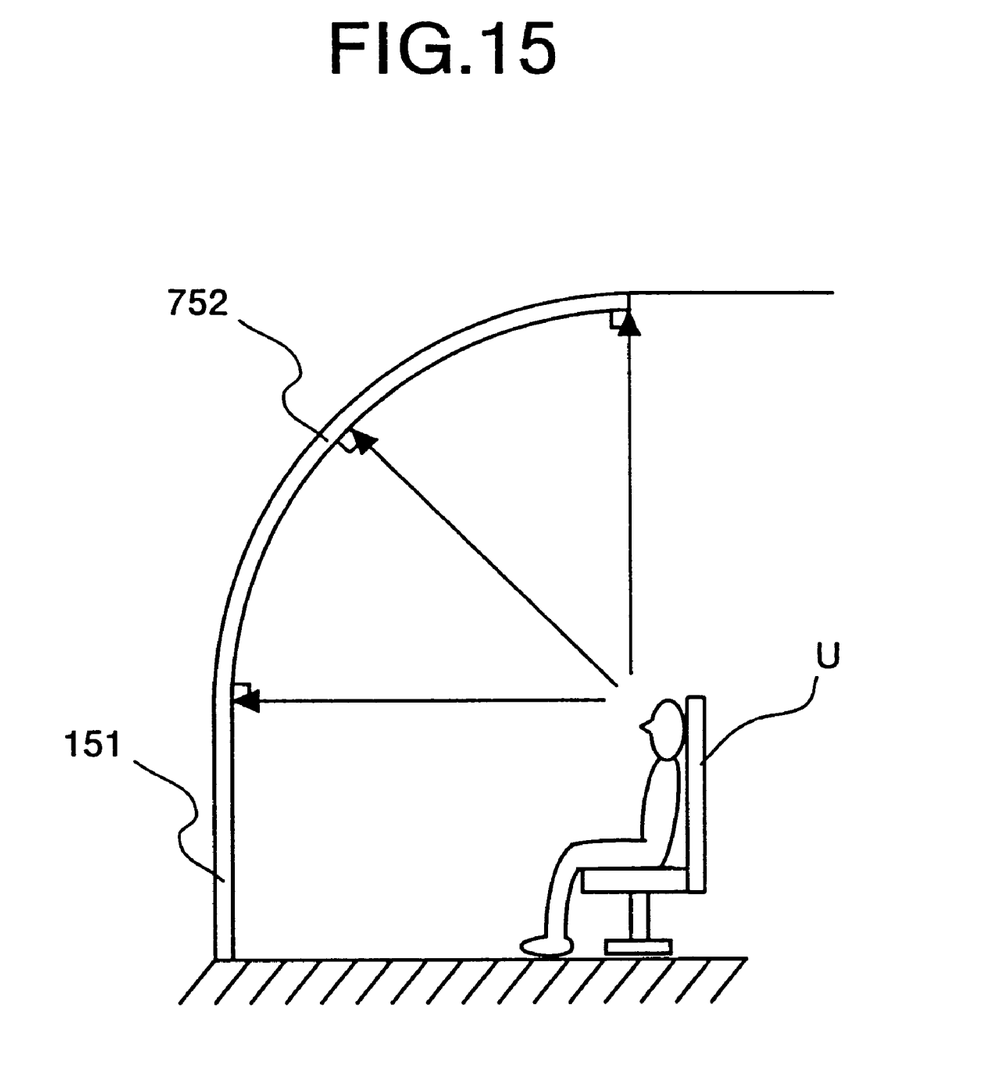
FIG. 15 is an explanatory view schematically showing a dummy magnifying display system according to other embodiments of the present invention.

As shown in FIG. 15, the slant section 152 in Embodiment 1 may have a cylindrical form. In this case, a cylindrical surface section 752 is provided so that a user U positions at a center of the circle. By forming the slant section in the cylindrical form, the user U's eyes forms a substantially right angle to the screen. And for this reason, any screen display section even made of liquid crystal or the like is not made to be hard to see. As for address setting, the cylindrical surface section 752 is regarded as a straightened plane, and each address may be allocated to each area like in Embodiment 1.

As described above, the invention forms with a first display unit with display elements arranged at a matrix to form a screen as well as with a second display unit having the same configuration as that of the first display unit and connected to the first display unit at an angle to form a screen. Then, the screen is repeatedly divided in the first display unit. A dummy display section obtained by extending the first display unit is provided on the second display unit, an image to be displayed on the dummy display section is displayed on the second display unit, and the screen is repeatedly divided taking into consideration a positional relation between the first display unit and the second display unit. Then, an image is displayed on a part or whole screen of the first and second display units by setting an address to each of the divided unit areas each time when the screen is divided, specifying this address, and giving display data to be displayed with a display element belonging to the specified divided unit area thereto. A control unit controls the operations described above.

As the invention has the construction as described above, a user feels, when looking at a dummy display section, as if the dummy display section is as an extension of first display unit, namely the first display unit is expanded. For this reason, by providing the second display unit on the ceiling of a room or the like, a screen of which size is larger than the actual screen can be obtained.

The invention connects the second display unit to an upper section, a lower section, or a side face section of the first display unit at a certain angle so that the second display unit is faced to a user. With the construction as described above, even a liquid crystal display or the like, which is hard to see from a slanting direction, is used for a screen, a user can easy to see the screen.

The invention provides the first display unit on a wall surface of a room, connects the second display unit to the first display unit, and provides the connected second display unit on a ceiling, a floor, or on a wall surface next to the wall surface of the room, so that forms of the divided unit areas are not identical to each other in the connected direction. Namely, when the first display unit and the second display unit are connected to each other, for example, at an angle by around 90 degrees, an image is not balanced unless forms of divided unit areas closer to the first display unit are larger and divided forms far from the first display unit are smaller. For this reason, if the forms of the divided unit areas are not identical in the connected direction, a user can see the image with natural feelings.

The invention connects a plurality of the second display units to an upper section, a lower section, or a side face section of the first display unit each at a certain angle so that the blind-like second display units are faced to users. For this reason, the number of users who can be faced to blind-like display units one by one are increased, and a large number of users can be easy to see images. Especially, the invention is appropriate as a screen of a movie theater or the like.

The invention has a main display unit located at the front part inside a hall and also has seat display units provided on the rear surfaces of seats each facing the front part therein. Also, each of the seat display units displays thereon a part of an image to be displayed on the main display unit and matches the main display unit by repeatedly dividing a screen taking into consideration a positional relation between the main display unit and each of the seat display units. For this reason, a plurality of users can see an image in a large screen. Especially, the front seats and users seated therein are not seen from users seated in the rear side, which allows any user to fully enjoy images.

This application is based on Japanese patent application No. HEI 9-267166 filed in the Japanese Patent Office on Sep. 30, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A dummy magnifying image display apparatus comprising:
    a first image display with display elements arranged in a matrix to form a part of a screen, said first image display being viewable by an observer;
    a second image display with display elements arranged in a matrix and connected to said first image display at an angle, said second image display being viewable by the observer and forming a part of the screen; and
    a controller for making said first and second image displays display an image on a part or whole of the screen by repeatedly dividing the screen in the first image display, making the second image display provide a dummy display section obtained by extending the first image display and displaying an image to be displayed on said second image display so that it appears to be displayed on said dummy display section, repeatedly dividing said screen taking into consideration a positional relation between the first image display and the second image display, setting an address to each of the divided unit areas each time when the screen is divided, specifying the address, and giving display data to be displayed with a display element belonging to said specified divided unit area thereto.

2. A dummy magnifying display apparatus according to claim 1; further comprising at least one of an upper section, a lower section, or a side face section, and wherein said second image display is connected to said upper section, lower section, or side face section at a predetermined angle to said first image display so that the second image display is faced to a user.

3. A dummy magnifying display apparatus according to claim 1; wherein said first image display is provided on a wall surface of a room; and said second image display is connected to said first image display and provided on a ceiling, a floor, or a wall surface next to said wall surface of the room, so that forms of said divided unit areas are not identical to each other in said connected direction.

4. A dummy magnifying display apparatus according to claim 1; further comprising at least one of an upper section, a lower section, or a side face section extended from said first image display, and further comprising a plurality of said second image displays, each connected to at least one of said upper section, lower section or side face section so that each said second display is at a predetermined angle to said at least one section, forming a blind like arrangement of second displays that are faced to users.

5. A dummy magnifying image display apparatus comprising:
a main image display with display elements arranged in a matrix to form a screen and located at the front part inside a hall;
a seat image display with display elements arranged in a matrix and being provided on each rear surface of seats each facing the front part in the hall; and
a controller for making said main image display an image and each of said seat image displays display a part of said image, the image on a part or whole screen thereof being formed by repeatedly dividing said screen in said main image display, displaying a part of image to be displayed on said main image display on each of said seat image displays and repeatedly dividing said screen taking into consideration a positional relation between the main image display and each of the seat image displays, setting an address to each of the divided unit areas each time when the screen is divided, specifying the address, and giving display data to be displayed with a display element belonging to said specified divided unit area thereto.

6. A dummy magnifying display apparatus according to claim 1, wherein said second image display comprises a curved surface and is connected to an upper section, a lower section, or a side face section of said first image display.

* * * * *